Sept. 22, 1942.  C. D. SHAW  2,296,296
MOLDING PROCESS
Filed Oct. 2, 1941  2 Sheets-Sheet 1
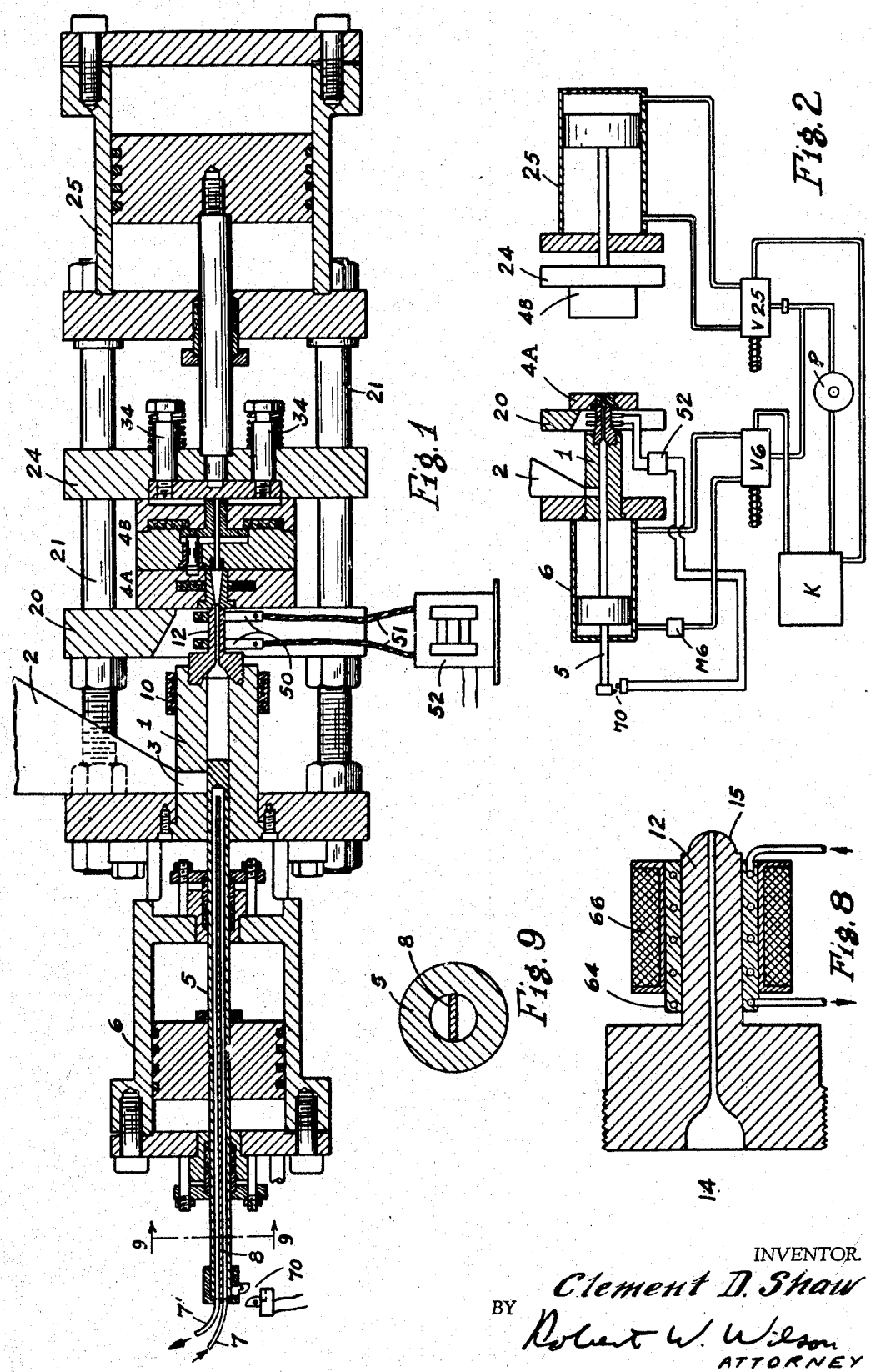
INVENTOR.
Clement D. Shaw
BY Robert W. Wilson
ATTORNEY Sept. 22, 1942. C. D. SHAW 2,296,296
MOLDING PROCESS
Filed Oct. 2, 1941 2 Sheets-Sheet 2

INVENTOR.
Clement D. Shaw
BY Robert W. Wilson
ATTORNEY

Patented Sept. 22, 1942

2,296,296

UNITED STATES PATENT OFFICE 2,296,296

MOLDING PROCESS

Clement D. Shaw, Shaker Heights, Ohio, assignor to William B. Hoey, Franklin, Mich., and Everett D. McCurdy, Cleveland, Ohio, as trustees Application October 2, 1941, Serial No. 413,341

4 Claims. (Cl. 18—55)

This application is a continuation in part of my pending application Serial No. 244,595 filed December 8, 1938, for Molding method and apparatus.

This invention relates to a method and apparatus for the manufacture of plastic articles by injection molding. It will be understood that the term plastic is used herein for the purposes of definition and not as a limitation. The term plastic is understood to mean any material mass which can be reduced to a plastic state by heat. The term "plastics" as here used includes thermoplastics particularly, defined as those materials in which no basic chemical change takes place when heated, the heat simply softening them to a plastic state and removal of the heat causing them to harden again. These are sometimes called "cold-set" plastics. In the thermoplastic group (not excluding others not named) are cellulose acetate, polystyrene, vinyl polymers, some rubber compounds and such synthetic rubber compounds as have thermoplastic properties, and others.

Although it is known in this art to mold thermoplastic materials by maintaining a supply in a constantly-replenished cylinder from which softened charges are successively forced into a mold or other forming element, difficulties are encountered in applying heat at the proper or most effective places and in the best manner so as to be immediately operative upon the charge passing into the mold, without applying heat at locations or in amounts or during periods of time such as to injure the material or impair the efficiency of the apparatus or method.

However, attempting to raise the temperature of the material in the cylinder to that which is best for molding presents difficulties in that the material does not flow well unless it is hot enough, but if it is long subjected to temperatures conducive to best flowing there is danger of burning the material, evidenced by discoloration or imperfect surface appearance. Some thermoplastic molding machines have been provided with means for applying higher heat at the nozzle than in the cylinder, but migration of such heat to the cylinder can injure the material in the cylinder, particularly if the machine is shut down for a while, or there is a delay in getting the next mold ready, and so on, letting the material in the cylinder heat up. Dripping of the softened material from the nozzle between shots is also a difficulty.

My invention is particularly directed to applying heat at the most advantageous stage of the process, in the most advantageous way and in the most desirable temperature ranges, while preventing such heat from affecting the plastic at the wrong time or for too long a time and from migrating to parts of the apparatus where it would be harmful. Another purpose is to avoid leakage at the nozzle between shots. Thus my invention is directed to the purpose of getting heat into the material just as it goes to the mold, so that the mold charge is highly fluent, but without any of the disadvantages above referred to.

A preferred form of machine suitable for the carrying out of my process is illustrated and described here, it being understood, however, that the principles of the process are susceptible of being applied by other apparatus and also that the apparatus, although particularly directed to the herein described process, is intended to be protected in such applications as it may have to other processes. The apparatus herein shown as the one which I regard as preferable for carrying out the process is the same as shown in my copending application Serial No. 244,595, and certain of the steps of the process are the same as or similar to the disclosure in that application.

To the accomplishment of the foregoing and related ends, said invention, then, consists of the means hereinafter fully described and particularly pointed out in the claims, the annexed drawings and the following description setting forth in detail certain means and one mode of carrying out the invention, such disclosed means and mode illustrating, however, but one of various ways in which the principle of the invention may be used.

In the accompanying drawings:

Fig. 1 is a central longitudinal section through a molding apparatus adapted to carry out my invention, shown with mold closed;

Fig. 2 is a diagrammatic view, partly in longitudinal section, illustrating operating and control mechanisms;

Fig. 8 is another enlarged fragmentary detail, taken on the same plane as Fig. 1, but showing an alternative construction; and Fig. 9 is an enlarged section on the plane 9—9, Fig. 1, illustrating a piston cooling detail.

General mechanism

Figure 3:
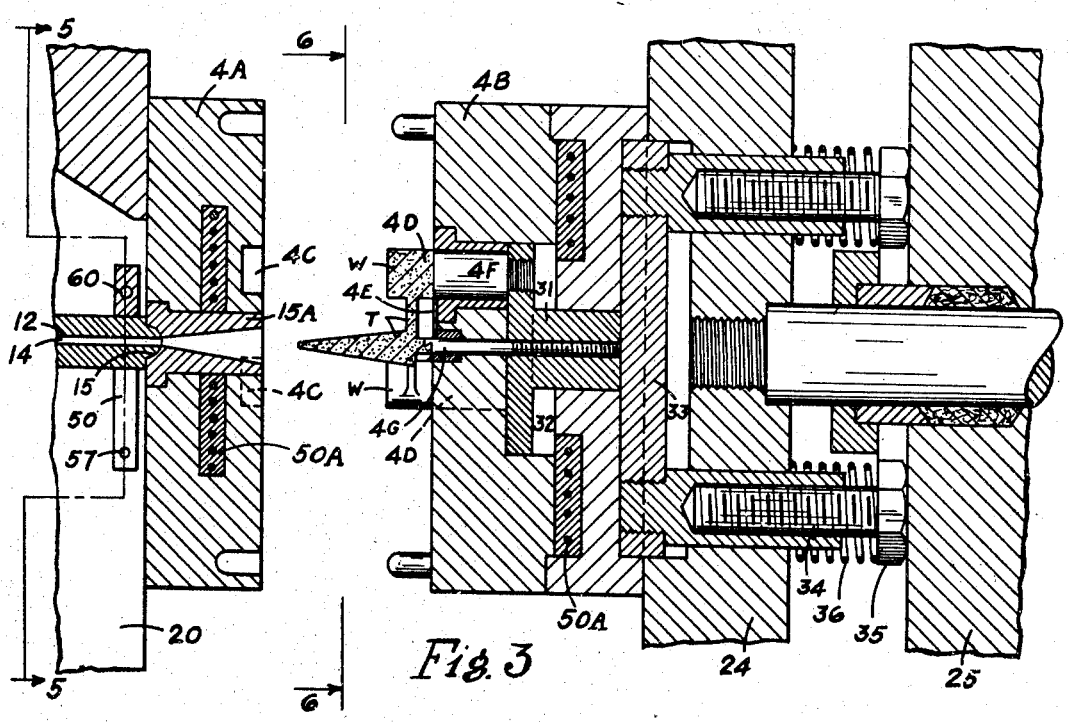
Fig. 3 is an enlarged detail on the same plane as Fig. 1, but of the mold portion only, with mold open.

Throughout the description such terms as "front" and "rear" are used in the sense of direction of flow of material; the charge is considered as being put in at the rear and going out at the front, as in a breech-loading gun.

Referring particularly to Fig. 1, the present preferred form of my apparatus comprises a charging cylinder 1, suitably supplied with material, as from a hopper 2 through a side port 3, these being representative of any appropriate source of supply. The bore of the cylinder forward of the port 3 is of capacity sufficient for one or more fillings of the molding space. The present illustration is of mold cavities 4C, 4D, the volume of which, with runners and sprues, is about one-fourth that of the cylinder, it being understood that these proportions are merely illustrative. The complementary elements of the mold cavities are respectively in a stationary mold block 4A and movable mold block 4B. A plunger 5, operated by suitable mechanism, of which the oil pressure cylinder 6 is an example, travels forward at each mold-filling cycle a sufficient distance to force a charge of plastic through the restricted bore of a nozzle 12 into the mold cavities 4C, 4D. After each stroke the plunger moves back, as in Fig. 4, clearing the port 3 and allowing a fresh charge of material to fall into the cylinder in advance of the plunger head, equal to the volume which has been ejected by the previous stroke.

Figure 4:
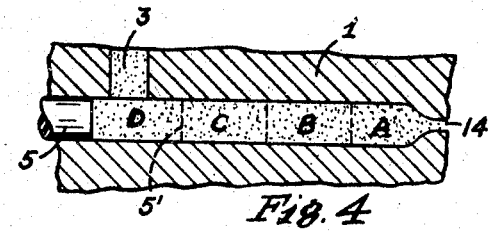
Fig. 4 is a diagrammatic section through the pressure cylinder, illustrating the mode of operation.

Thus the operation is that a supply of the plastic is continually being moved forward through the charging cylinder step-by-step, as shown in Fig. 4, where A represents the charge which will be expelled on the next stroke, B and C successive charges, and D the charge last received. The dotted line 5′, dividing C from D, represents the extreme forward position the front face of plunger 5 assumes in expelling each charge in the particular operation illustrated. This position 5′ obviously depends on the volume of material required to fill the molding spaces. Ordinarily the total volume of material in the cylinder will be equal to from 3 to 6 charges of the mold, although this is largely a matter of convenience. The plunger 5 is suitably cooled, as for example by circulation of water through a central bore in the plunger, Figs. 1 and 9, from inlet 7 around baffle 8 to outlet 7′. The front (discharge) end of cylinder 1 is suitably heated, as for example by resistance coil 10. Consequently the new supply of plastic, usually in the form of powder, chips, or the like, coming in cold at the rear (charge D, Fig. 4) is gradually warmed up, and has attained the full temperature of the forward end of the cylinder, and a pasty fluent state, when it reaches position A, ready to be ejected through the nozzle 12. The forward end of the cylinder bore converges into the restricted orifice 14 of nozzle 12. This orifice will ordinarily have an inside diameter on the order of .090 to .1250 inch. The nozzle 12 is preferably finished in a nose such as the hemisphere 15 which accurately fits a corresponding recess in a hardened insert 15A in the stationary mold plate 4A. A flaring gate leads through insert 15A into the molding space.

Figure 7:
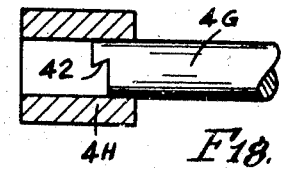
Fig. 7 is an enlarged fragmentary detail from Fig. 1, taken on the same plane.

The particular mold herein illustrated is a simple type for forming several cylindrical objects or work pieces W, three in the present instance, and consists of three identical front cavities, 4C in the block 4A, and complementary rear cavities 4D in the movable block 4B, all at 120 degree intervals, and with parting line at half the cavity depth. The cavities are connected by runners 4E. In the particular mold shown the rear cavities 4D are bushings inserted in the block 4B, and the bottoms are the knock-out pins 4F, but obviously the mold in actual use will be shaped appropriately to the intended product. The front mold 4A is carried on front platen 20 which in turn is supported by the strain rods 21 of the press assembly and may be moved for insertion of nozzles of different length, and so on, but is stationary during any run. The rear mold plate 4B is fast to rear platen 24, movable by a piston and cylinder 25, or other appropriate mechanism. In the specific arrangement shown the total pressure applied to the piston of 25 is greater than that applied to the plunger 5, so that filling of the mold spaces stops the plunger without causing the mold to open. A suitable knock-out mechanism, with related features, is shown in detail in Figs. 1 and 3, consisting of the knock-out pins 4F which in the present instance are the mold bottoms, and a smaller central pin 4G, all fast to a headed stud 31 movable in the space 32 by means of yoke 33 and pins 34, all as usual in knock-out mechanism. The knock-out stroke is adjustable by cap screws 35 and retracted by springs 36. As best seen in Fig. 7, the central pin, or sprue puller, 4G moves in and out of a bushing 4H in mold block 4B opposite the nozzle orifice 14, similarly to the action of the pins 4F. The sprue puller 4G is undercut at its outer end to provide a hook 42 to engage the sprue material and help break the same from the work pieces W, as further explained under the heading "Operation," below.

Temperature control

The temperature control in various parts of the apparatus is a matter of importance, and will now be described, reserving explanation of the purposes of such control to the description of the operation.

Figure 5:
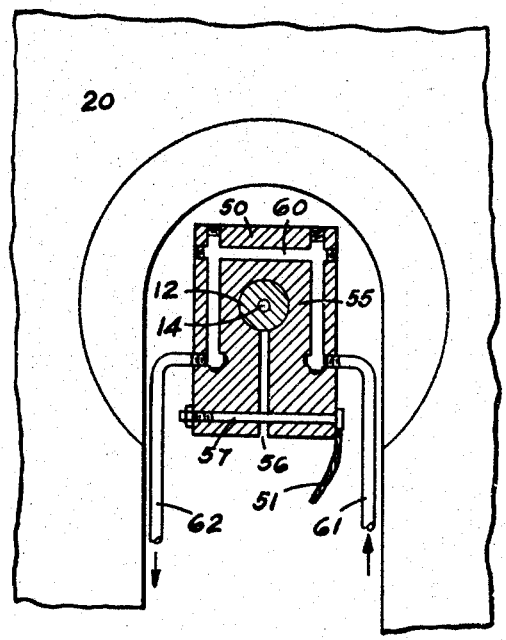
Fig. 5 is a detail on plane 5—5, Fig. 3, illustrating an electrode detail.
Figure 6:
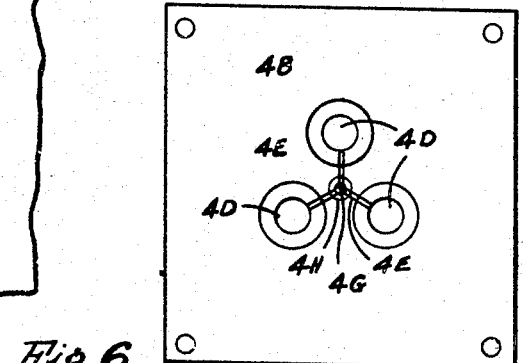
Fig. 6 is a face view of the movable die half, taken on the plane 6—6 of Fig. 3.

The cylinder 1 is heated at its ejection end by suitable apparatus, herein conveniently illustrated as the resistance coil 10 already mentioned, and such thermal insulation as may be desirable can be applied but none is shown herein. The plunger 5 is appropriately fitted for the circulation of cooling fluid as already described. The nozzle 12 is equipped for both heating and cooling, as best shown in Figs. 1, 5 and 8 and described below. The mold halves 4A and 4B are heated or cooled as the case may be as by elements 50A, Figs. 1 and 3, which can represent either heating or cooling means.

The preferred arrangements for heating and cooling the nozzle 12, shown in Figs. 1, 3 and 5, comprise resistance heating and water cooling, although other methods of heating and cooling are not excluded from the invention. For example, Fig. 8 illustrates induction heating. Electrodes 50, which in the present illustrative embodiment are of identical construction, are clamped upon the nozzle 12 near its ends, and are connected by cables 51 to the secondary of a transformer 52 which supplies a current of high amperage and low voltage, similar to that used in spot welding, thus heating the nozzle by resistance. A preferred electrode construction comprises a solid copper block shown in Fig. 5 in section transverse to the nozzle, bored through as at 55 to fit snugly upon the nozzle 12 and split at 56 from such bore to one edge, so that it can be clamped by a bolt 57. The electrode is internally channeled by a U-shaped passage 60 for circulation of cooling water or other suitable fluid, with inlet connection 61 and outlet connection 62. The cooling water is best allowed to run constantly.

A convenient arrangement for induction heating is that of Fig. 8, wherein the nozzle 12 is jacketed as at 64 for constant circulation of cooling fluid, and the jacket is in turn surrounded by an induction coil 66.

Other suitable arrangements for heating and cooling the nozzle may be employed.

Operation

In the usual operation the cylinder 1 is charged with the material in the form of powder, grains, chips or other convenient form.

For thermoplastic materials the temperature of the material in the forward end of the cylinder may be on the order of from room temperature to about 550° F., according to the composition of the material employed. Such are extremes. For the more usual compounds one prominent maker of materials recommends from 350° F. to 530° F. for polystyrenes, 315° F. to 450° F. for general purpose cellulose acetates, 330° F. to 480° F. for heat and moisture resistant cellulose acetates, 280° F. to 320° F. for general purpose vinylites, and up to about 340° F. for certain special vinylites; all the foregoing being for injection molding. The temperatures maintained depends upon the characteristics of the molding material used and the pressure in pounds per square inch applied thereto, the quantity ejected at each shot, flow distance, size of article to be molded, and other factors, all as may be most appropriate. The plunger 5 is arranged to deliver pressures on orders up to 90,000 pounds per square inch to eject the material. Pressures, like temperatures vary with the material, but by my process temperatures somewhat below the standard recommendations, and pressures somewhat above, produce good results. It will therefore be apparent that by my process danger of injury to the material in the cylinder is completely avoided.

The circulation of cooling fluid in the plunger 5 keeps the material immediately against the plunger face in a condition of separate particles in more or less granular condition, not softened, so that the material does not creep around and build up on the sides of the plunger. That is, this coolness prevents the small amount of material with which the plunger end is constantly in contact from becoming softened and leaking between the plunger and the cylinder wall, which would cause the plunger to bind.

The nozzle is heated while ejection is in progress to a temperature which may be anywhere from 400° F. to 1200° F. according to such considerations as the exact composition of the plastic being worked, the amount of filler it contains (if any), the size and complexity of the mold, and similar factors. It will be appreciated that different materials can stand different heats, and that no definite rule can be laid down applicable to all materials, but usually the nozzle temperature will be somewhere from two to four times the temperature in the front part of the cylinder. A basic feature of my invention is that for any material the nozzle can be heated to a temperature which would be injurious to the material were such material subjected to it for more than the time of a rapid passage through the nozzle. The material is not subjected to the relatively high heat long enough to be hurt. Thus, although the charge being ejected is in a fine stream, its speed of movement is so great that it has not become heated up to nozzle temperature when it enters the molding spaces. The preferred nozzle heating is by generation of heat in the nozzle itself, just before and during the ejection stroke of the plunger 5, which stroke is of momentary duration. The constantly circulating coolingwater in the electrodes, or other suitable cooling arrangement, prevents transfer of heat from the nozzle either to the cylinder 1 or to the mold, both of which are held at lower temperatures than are intermittently applied to the nozzle. This cooling also enables the material to be solidified in the nozzle channel 14 when desired.

The temperature maintained in the mold will also be controlled in consonance with factors similar to those which determine the temperature to be used in the cylinder and in the nozzle. For thermoplastic plastics mold temperatures are on the order of from chill to 250° F., while for most synthetic rubbers the mold is kept from 300° F. to 320° F.

The time, i. e., speed, of ejection by movement of the plunger 5 is determined by the same factors as govern the nozzle temperature, such factors including the quantity of material ejected in each shot, characteristics of the material, flow distance, etc.

Definite controls for speed of the ejecting stroke and for heating the nozzle are coordinated both as to the heating elements and as to the plunger travel. These controls may be of the thermionic type, such as used in resistance spot welding apparatus, or limit switches, or other suitable devices, as indicated in purely diagrammatic style by switch mechanism 70, Figs. 1 and 2. The effect is that the nozzle passage 14 is heated and the amount of material necessary to fill the molding spaces is ejected through the heated passage in a thin fast-moving stream and at the same time subjected to a more intense heat than it could stand for any substantial period, but inasmuch as it is subjected to such heat only during a period on the order of a fraction of a second, no deleterious effects occur. The ejection is sufficiently rapid to be loosely termed "shooting," speeds on the order of several hundred feet per minute or faster being contemplated, although obviously the optimum speed will be dependent upon such factors as the temperature, the composition of the material, the length of the passage, and the amount of material being being passed in each shot.

The charge is thoroughly homogenized in passing through the nozzle and at the same time given a heat load, perhaps partly latent, above the temperature it reached in cylinder 1. Thus the final heat load necessary for best molding is imparted in the nozzle instead of in the cylinder, and the material carries with it into the mold cavity a heat load sufficient so that the entire quantity of the ejection shot (except sometimes a slug from the nozzle which is specially disposed of) is in fluent phase and the mold is filled with this homogeneous fluent mass, with no precooling or partial solidification of any portions. The result is that striation, case hardening, presence of solidified inclusions, and so on, are avoided.

It has been mentioned that a slug may form in the ejection orifice due to the cooling of the nozzle between shots. Such slug will usually be partly or completely resolved to plastic state when the heat is turned on nozzle 12. However, some material may stay in solid form, and it is to receive this material that the pin 4G is sunk, when the mold is closed, considerably below the face of the bushing 4H. This slug is joined onto the sprue and runner waste T, Fig. 3, and caught by the hook 42 so that it tends to break away from the work pieces W at knock-out. The foregoing is one convenient arrangement previously known for this purpose.

An example of suitable operating mechanism for the machine of Fig. 1 is shown in Fig. 2 wherein pressure for actuating the cylinders 6 and 25 is supplied by a pump P, drawing upon a tank K and appropriately admitted to and released from the cylinders by valves V6 and V25, respectively. The pump will constantly operate during the operation of the machine, and the valves return the oil or other liquid through bypasses to tank K when pressure is not being admitted to the cylinders. A metering valve M6 may be employed to govern the pressure applied to the forward movement of the plunger 5. The switch mechanism 70 cuts in the transformer 52 at the proper time with relation to the ejecting stroke, ordinarily very slightly before such stroke begins, and cuts it out as the stroke ends, but does not cut it in on the return stroke of the plunger. It will be understood that the spacing of parts and other details of the showing of 70 in Figs. 1 and 2 are not proportionate to any time intervals, but merely represent graphically that there is appropriate coordination of control between the heating of the nozzle and the movement of the plunger.

Other modes of applying the principle of my invention may be employed instead of the one explained, change being made as regards the means and steps herein disclosed, provided those stated by any of the following claims or the equivalent of such stated means be employed.

I therefore particularly point out and distinctly claim as my invention:

1. The method of molding plastic material which comprises softening a quantity of said material, causing said material to move at high speed in a small stream into a mold, heating said material while moving in said small stream and subjecting the same to a temperature substantially in excess of softening temperature, maintaining the velocity of said stream while subjecting the material to said temperature and while filling said mold, the stream coming to rest upon completion of the filling of the mold, and stopping the heating of said stream in timed relation to the stopping thereof, and maintaining a substantially solidifying temperature on the material of said stream while said stream is quiescent.

2. That method of molding plastic material by injection of mold-filling charges from a cylinder through a passage into a mold which comprises maintaining substantially constant temperatures on at least the forward portion of said cylinder and on said mold adapted respectively to soften the material in at least the forward portion of said cylinder and to set the material in said mold, applying to said passage during movements of charges therethrough a temperature substantially above those on said cylinder and on said mold, but applying to said passage between movements of charges therethrough a temperature substantially below that on said cylinder.

3. That method of molding plastic material by injection of mold-filling charges from a cylinder through a passage into a mold by forceful movement of a piston into said cylinder opposite said passage which comprises maintaining substantially constant temperatures on the material at least in the forward portion of said cylinder adapted respectively to soften said material, maintaining a temperature on said piston substantially less than maintained on said softened material, applying to said passage during movement of a charge therethrough a temperature substantially above that on the forward portion of said cylinder and applying to said passages between movements of charges therethrough a temperature substantially below that on the forward portion of said cylinder.

4. The method of molding thermoplastic materials which consists in warming a mass of such material in a chamber to a state of plasticity, and successively ejecting plastic charges from said chamber and adding substantially equal charges of raw material thereto, conveying said ejected charges into a mold while maintaining said mold at a temperature to solidify the charges of material received therein, successively receiving said charges in said mold, holding the same therein during a solidifying period of time and removing said solidified charges therefrom, conveying said successive charges from said chamber to said mold through a conduit providing a fluid tight connection therebetween at least during the period of said delivery, alternately and successively applying heat to said conduit while conveying said material therethrough and taking heat from said conduit in synchronized relation to the cessation of movement of said charges from said chamber to said mold.

CLEMENT D. SHAW.